(12) United States Patent
Eluvan et al.

(10) Patent No.: US 12,406,405 B2
(45) Date of Patent: Sep. 2, 2025

(54) ENHANCED INTERACTIVE FEATURES FOR A VIDEO PRESENTATION SYSTEM

(71) Applicant: SLING MEDIA PVT LTD, Bangaluru (IN)

(72) Inventors: Rakesh Eluvan, Bangalore (IN); Amit Kumar, Bagalore (IN); Gopikumar Ranganathan, Bangalore (IN)

(73) Assignee: DISH Network Technologies India Private Limited (IN)

( * ) Notice: Subject to any disclaimer, the term of this patent is extended or adjusted under 35 U.S.C. 154(b) by 287 days.

(21) Appl. No.: 17/643,893

(22) Filed: Dec. 13, 2021

(65) Prior Publication Data

US 2023/0186528 A1 Jun. 15, 2023

(51) Int. Cl.
*G06T 11/00* (2006.01)
*G06F 3/04842* (2022.01)
*G06V 20/40* (2022.01)

(52) U.S. Cl.
CPC .......... *G06T 11/00* (2013.01); *G06F 3/04842* (2013.01); *G06V 20/42* (2022.01); *G06V 20/46* (2022.01); *G06T 2200/24* (2013.01); *G06V 2201/10* (2022.01)

(58) Field of Classification Search
None
See application file for complete search history.

(56) References Cited

U.S. PATENT DOCUMENTS

| | | | |
|---|---|---|---|
| 11,212,331 B1* | 12/2021 | Gaiduchenko | H04L 65/762 |
| 11,601,618 B1* | 3/2023 | Slotznick | H04N 7/15 |
| 2013/0125160 A1* | 5/2013 | Fontan | H04N 21/4781 |
| | | | 725/23 |
| 2017/0001111 A1* | 1/2017 | Willette | A63F 13/49 |
| 2018/0054659 A1* | 2/2018 | Goswami | H04N 13/243 |
| 2020/0215410 A1* | 7/2020 | Li | A63B 24/0021 |
| 2021/0076099 A1* | 3/2021 | Ganschow | H04N 21/47214 |
| 2023/0007342 A1* | 1/2023 | Shah | H04N 21/439 |

* cited by examiner

*Primary Examiner* — Sarah Le
(74) *Attorney, Agent, or Firm* — KW Law, LLP

(57) ABSTRACT

A system, related operating methods, and computer readable storage media are disclosed here. The disclosed subject matter relates to methods of providing augmented reality features in connection with presentation of video content. A disclosed method involves: causing presentation of a video program at a user device associated with a viewing user; obtaining metadata associated with the video program; processing a live video feed that includes the viewing user; generating augmented reality overlay content for the live video feed, wherein visual appearance of at least some of the augmented reality overlay content is influenced by the obtained metadata; and causing presentation of an enhanced version of the live video feed at the user device associated with the viewing user, the enhanced version of the live video feed comprising the augmented reality overlay content.

18 Claims, 8 Drawing Sheets

ENHANCED INTERACTIVE FEATURES FOR A VIDEO PRESENTATION SYSTEM

TECHNICAL FIELD

Embodiments of the subject matter described herein relate generally to systems and methodologies for delivering content (such as video content) over a data communication network. More particularly, embodiments of the subject matter relate to a video content delivery system that supports a multi-user video presentation mode.

BACKGROUND

The prior art includes various media playback devices and media player applications designed to play digital media content (e.g., audio, video, or images). Client devices (such as mobile phones, portable computer devices, desktop computer devices, gaming devices, and medical devices) may include media player applications that can play streaming media content, locally stored or recorded media files, and/or media content stored on a tangible memory element such as flash memory, an optical disc, or the like. The presentation of video or audio content can also be supported by vehicle instrumentation panels, tools, system control panels, and the like. Live video streaming services and video on demand (VOD) services allow viewers to obtain television programs, movies, sports, and other types of video content directly over the Internet or a similar network.

BRIEF SUMMARY

This application discloses a method of providing augmented reality features in connection with presentation of video content. An embodiment of the method involves: causing presentation of a video program at a user device associated with a viewing user; obtaining metadata associated with the video program; processing a live video feed that includes the viewing user; generating augmented reality overlay content for the live video feed, wherein visual appearance of at least some of the augmented reality overlay content is influenced by the obtained metadata; and causing presentation of an enhanced version of the live video feed at the user device associated with the viewing user, the enhanced version of the live video feed comprising the augmented reality overlay content.

This application also discloses exemplary embodiments of a system having at least one processor and at least one processor-readable medium associated with the at least one processor. The at least one processor-readable medium stores processor-executable instructions configurable to be executed by the at least one processor to perform a method of providing augmented reality features in connection with presentation of video content. An embodiment of the method involves: causing presentation of a video program at a user device associated with a viewing user; obtaining metadata associated with the video program; processing a live video feed that includes the viewing user; generating augmented reality overlay content for the live video feed, wherein visual appearance of at least some of the augmented reality overlay content is influenced by the obtained metadata; and causing presentation of an enhanced version of the live video feed at the user device associated with the viewing user, the enhanced version of the live video feed comprising the augmented reality overlay content.

This application also discloses at least one non-transitory machine-readable storage medium having executable instructions stored thereon. The instructions are configurable to cause at least one processor to perform a method of providing augmented reality features in connection with presentation of video content. An embodiment of the method includes the steps of: causing presentation of a video program at a user device associated with a viewing user; obtaining metadata associated with the video program; processing a live video feed that includes the viewing user; generating augmented reality overlay content for the live video feed, wherein visual appearance of at least some of the augmented reality overlay content is influenced by the obtained metadata; and causing presentation of an enhanced version of the live video feed at the user device associated with the viewing user, the enhanced version of the live video feed comprising the augmented reality overlay content.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
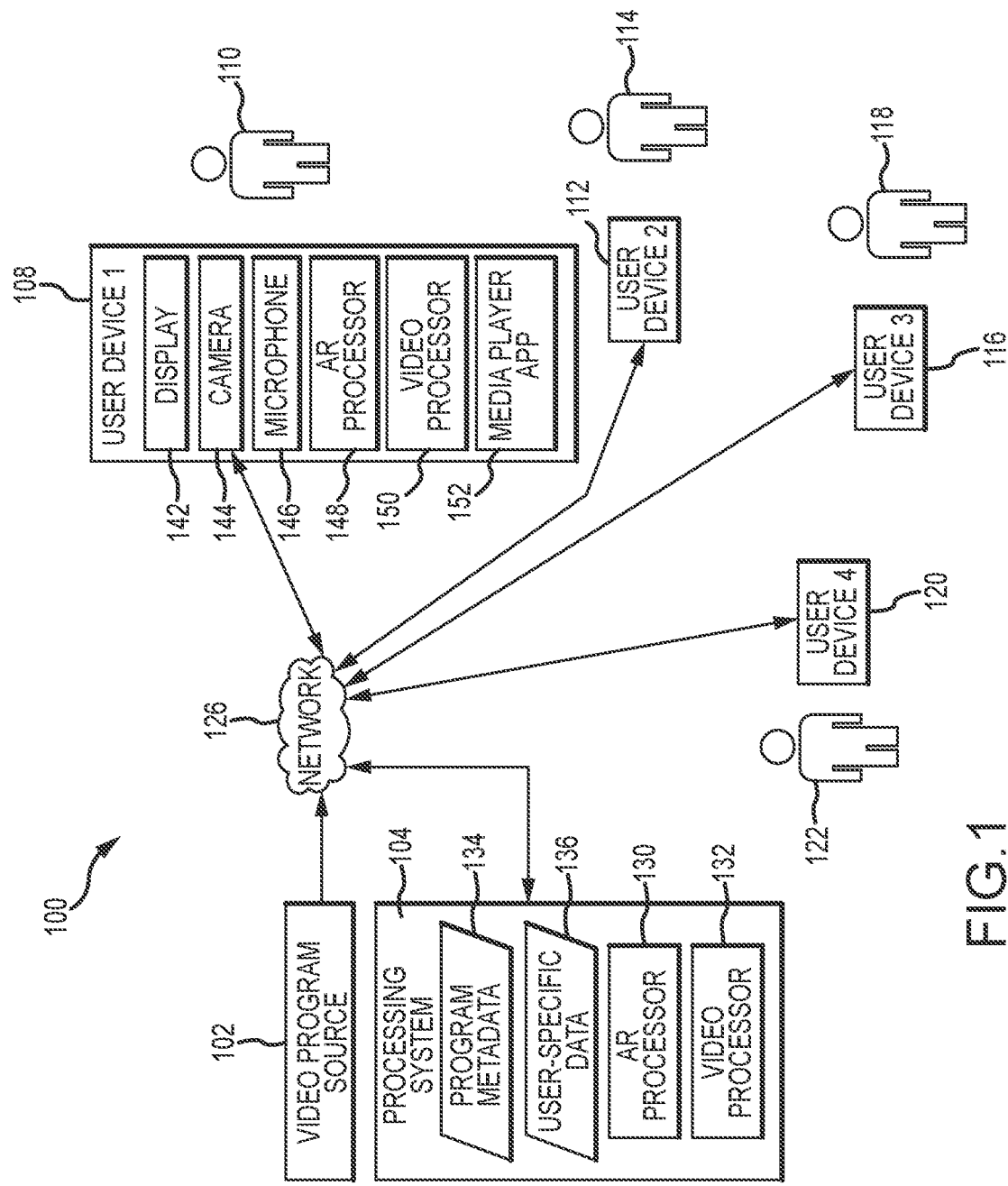
FIG. 1 is a simplified block diagram representation of an exemplary embodiment of a system that supports the delivery of video content to viewing users.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or computer instructions, various elements of the systems and devices described herein are essentially the code segments or instructions that perform the various tasks. In certain embodiments, the program or code segments are stored in at least one tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques and methodologies related to signal processing, data transmission and file transfer, signaling, network control, communication systems, video broadcasting systems, video storage, video encoding and decoding, video playback, video game design, video processing and analysis, augmented reality features, artificial intelligence, machine learning, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter presented here relates to certain features of a media content delivery system (which may be realized as a video services system that supports live and/or on-demand playback of media content, such as a satellite video system, a cable video system, a streaming media system, or the like). More specifically, the disclosed subject matter relates to a system that generates and provides an enhanced version of a live video feed of a viewing user during presentation of a video program. The enhanced version of the live video feed includes augmented reality feature(s) that are somehow linked with and/or contextually related to the video program. Alternatively or additionally, the enhanced version of the live video feed includes augmented reality feature(s) that are somehow linked with and/or contextually related to user-specific data associated with the viewing user. In certain embodiments, the system supports a watch party mode (multiple viewing users are presented with the same video program at the same time, and the live video feeds of the viewing users are provided with the video program). Accordingly, the disclosed augmented reality features can supplement a traditional watch party viewing experience with relevant augmented reality items that are contextually linked with at least some content of the video program and/or that are of interest to the viewing users. For example, if a baseball game is being viewed, the augmented reality items may be baseball themed. As another example, if a science fiction movie is being viewed, the augmented reality items may be futuristic in appearance. Moreover, augmented reality methodologies can be employed to gamify the viewing experience. For example, if a tennis match is being viewed, then an enhanced video feed of a viewing user can be augmented in a way that allows the viewing user to play a tennis video game or in a way that allows the viewing user to react to action that appears in the viewed tennis match. The disclosed system and operating methodology may leverage a variety of currently available technologies, such as: video game technology; augmented reality technology; artificial intelligence technology; machine learning technology; movement or motion detection technology; and video processing technology.

The embodiment described here processes image/video data and renders visual content locally at a user device in connection with one or more augmented reality techniques. Augmented reality techniques and technologies are generally known. Briefly, augmented reality "is an interactive experience of a real-world environment where the objects that reside in the real world are enhanced by computer-generated perceptual information, sometimes across multiple sensory modalities" (as defined by Wikipedia at the time of this writing). In the context of this description, augmented reality technology is utilized to enhance the appearance of a live video feed of one or more viewing users during the presentation of a video program.

A media player of the type described herein can be rendered and displayed on any suitably configured display of a user device associated with a viewing user (e.g., a media presentation device, a playback device such as a television system or a set-top box, a client device, a computing device, or a digital media player device). The display can be integrated with a host electronic device, or it can be a distinct component that communicates and cooperates with an electronic device. In certain embodiments, a display can be realized as a removable peripheral component that is compatible with a host electronic device. In yet other embodiments, the display can be implemented with a more complex system, tool, or instrument (such as a vehicle, a piece of manufacturing equipment, an appliance, or the like). In this regard, an electronic device having a display can be realized as any of the following devices, systems, or components, without limitation: a mobile telephone; a personal computer (in any form factor, including a desktop, a laptop, a handheld, etc.); a tablet computing device; a wearable computing device; a video game device or console; a digital media player device; a household appliance; a piece of home entertainment equipment such as a smart television set; a medical device; a navigation device; an electronic toy or game; a vehicle instrument or instrument panel; a control panel of a piece of machinery, a tool, or the like; a digital camera or video camera; a musical instrument; or a remote control device. It should be appreciated that this list is not exhaustive, and it is not intended to limit the scope or application of the embodiments described herein.

Turning now to the drawings, FIG. 1 is a simplified block diagram representation of an exemplary embodiment of a system 100 that is suitably configured to support the techniques and methodologies described in more detail below. The system 100 (which has been simplified for purposes of illustration) generally includes, without limitation: at least one video program source 102 (referred to in the singular form herein for the sake of convenience); a processing system 104 having at least one processor associated therewith; and at least one user device owned or operated by at least one viewing user. For this particular example, the system 100 supports four user devices associated with four viewing users: a first user device 108 for a first viewing user 110; a second user device 112 for a second viewing user 114; a third user device 116 for a third viewing user 118; and a fourth user device 120 for a fourth viewing user 122. It should be appreciated that an embodiment of the system 100 can be configured and scaled to support any number of viewing users, including only one viewing user, and that the described implementation that supports up to four viewing users is merely one possible embodiment.

The system 100 includes or cooperates with at least one data communication network 126 that facilitates communication between the various components, systems, and logic utilized by the system 100. For example, the data communication network 126 can be utilized for the communication of media content (e.g., recorded video content, live streaming video content, stored on-demand media content) from the video program source 102 to end user systems (such as the user devices 108, 112, 116, 122) as needed. Moreover, the data communication network 126 can be utilized to transfer configuration data, user-specific data, and/or user settings from the user devices 108, 112, 116, 122 to an appropriate processing device or system, such as the processing system 104.

The data communication network 126 is any digital or other communications network capable of transmitting messages between senders and receivers. In various embodiments, the network 126 includes any number of public or private data connections, links or networks supporting any number of communications protocols. The network 126 may include the Internet, for example, or any other network based upon TCP/IP or other conventional protocols. In various embodiments, the network 126 also incorporates a wireless and/or wired telephone network, such as a cellular communications network for communicating with mobile phones, personal digital assistants, and/or the like. The network 126 may also incorporate any sort of wireless or wired local area networks, such as one or more IEEE 802.3 and/or IEEE 802.11 networks. In practice, the system 100 may cooperate with and leverage any number of wireless and any number of wired data communication networks maintained or operated by various entities and providers. Accordingly, communication between the various components of the system 100 may involve multiple network links and different data communication protocols. In this regard, the network 126 can include or cooperate with any of the following, without limitation: a local area network; a wide area network; the Internet; a personal area network; a near-field data communication link; a cellular communication network; a satellite communication network; a video services or television broadcasting network; a network onboard a vehicle; or the like. The components of the system 100 may be suitably configured to support a variety of wireless and wired data communication protocols, technologies, and techniques as needed for compatibility with the network 126.

The video program source 102 represents any suitably configured system, device, and/or computer-readable storage element that is capable of delivering or otherwise providing video program content to the user devices 108, 112, 116, 122. In some embodiments, the video program source 102 may also provide video program content to the processing system 104. The video program source 102 may be implemented to provide storage of on-demand video content and/or live video program content. Although only one video program source 102 is depicted in FIG. 1, an embodiment of the system 100 can include more than one video program source 102 to service different geographical regions, locales, time zones, or the like. In certain embodiments of the system 100, the video program source 102 is implemented as a native component, subsystem, or element of one or more of the user devices 108, 112, 116, 122. For example, the video program source 102 may be realized as a processor-readable storage element that is native to a user device (e.g., an onboard memory component, a portable memory card, or a removable storage drive).

In practice, the video program source 102 may be realized as a network server device, a component that resides in the user's local network, a digital video recorder (DVR) device, a hard drive of a computer system, a network attached storage (NAS) device, an edge server of a content delivery network (CDN), or the like. In this regard, the video program source 102 may be deployed as a head end facility and/or a satellite uplink facility for the system 100. In some embodiments, the video program source 102 may include or cooperate with one or more web-based content delivery applications, services, or providers. To this end, the video program source 102 may function to control content, signaling data, programming information, and other data sent to any number of receiving components.

The video program source 102 may include or cooperate with a suitably configured storage architecture, which may be realized with one or more hardware components, memory storage devices (e.g., hard disk drives or solid state memory), database systems, or the like. The storage architecture is configured, maintained, and operated to store on-demand media content for on-demand playback via at least one data communication link of the network 126. In practice, an embodiment of the video program source 102 may include or cooperate with any number of storage elements or databases as needed to store media content (including video programming) for the volume of end users or subscribers supported by the system 100.

The processing system 104 may be implemented as a network-based or cloud-based computing system that is configured, programmed, and operated in an appropriate manner to support the methodologies described herein (in particular, the techniques and methodologies related to the processing of video content and augmented reality content). In certain embodiments, the processing system 104 includes or cooperates with an augmented reality (AR) processor 130 and a video processor 132, wherein each processor 130, 132 represents the processing power and computer-driven logic related to the respective function. Accordingly, the AR processor 130 is responsible for performing various AR tasks that support the functionality of the system 100, and the video processor 132 is responsible for performing various video processing tasks that support the functionality of the system 100. As described in more detail below, the processing system 104 may obtain, maintain, and process program metadata 134 that is associated with video programs and/or user-specific data 136 that is associated with the viewing users.

A user device 108, 112, 116, 120 may be realized in any number of different ways, and it may be suitably configured as needed to perform any number of desired functions, such as the presentation of audio content, video content, or audio-visual content. For example, a user device 108, 112, 116, 120 may be implemented as any of the following, without limitation: a computing device; a video game device; a smartphone; a tablet device; an electronic medical device; a household or other electronic appliance; a digital media player device; a digital media place-shifting device; a television set; a set top box for a video services receiver; stereo or other entertainment equipment; an alarm clock; a wearable device; a vehicle entertainment system; or the like. These examples are not intended to limit or otherwise restrict the scope of the embodiments described herein.

The following description of the user device 108 (which is illustrated in more detail) also applies to the other user devices 112, 116, 120. The user device 108 may be configured, programmed, and operated in an appropriate manner to support the methodologies described herein (in particular, the techniques and methodologies related to the processing and presentation of video program content and augmented reality content). In certain embodiments, the user device 108 includes or utilizes, without limitation: a display 142; a camera 144; a microphone 146; an AR processor 148; a video processor 150; and a media player application 152.

The display 142 may be native to the user device 108, or it may be a peripheral component that is coupled to the user device 108 for purposes of receiving and presenting image and video information from the user device 106. FIG. 1 depicts a version of the system 100 that includes a user device 108 having an integrated native display 142 (e.g., a laptop computer, a tablet computing device, or a mobile smartphone).

At least one camera 144 captures image data (still images and/or video) at the user device 108. In certain embodiments, a user-facing camera 144 is configured, positioned, and operated with the user 110 in the field of view, such that the face/head, limbs, hands, body movements, motion, and activity of the user 110 can be captured for analysis and rendering in a corresponding live video feed. The camera 144 may be incorporated into the user device 108 as a native feature. Alternatively or additionally, the camera 144 may be realized as a peripheral device that is distinct from the user device 108. Alternatively or additionally, the camera 144 may be incorporated into a device other than the user device 108, such as a separate laptop or tablet computer device, a separate display or monitor, a smart television set, or a video services set-top box.

A camera 144 utilized by the system 100 is configured to capture images (still and/or video images) in accordance with well-established digital imaging technologies. For reasons that will become apparent from the following description, the camera 144 is either a forward facing camera or is designed such that it can function as a user-capturing camera in at least one operating mode. Accordingly, images obtained by the camera 144 can be rendered on the display 142 in real time (or in substantially real time such that any delay perceived by the user 110 is insignificant). As explained in more detail below, the camera 144 and the display 142 cooperate to support augmented reality procedures related to the system 100.

At least one microphone 146 captures audio at the user device 108. The microphone 146 allows the user 110 to communicate with other users 114, 118, 122 of the system 100. The microphone 146 may be incorporated into the user device 108 as a native feature. Alternatively or additionally, the microphone 146 may be realized as a peripheral device that is distinct from the user device 108. Alternatively or additionally, the microphone 146 may be incorporated into a device other than the user device 108, such as a separate laptop or tablet computer device, a separate display or monitor, a smart television set, or a video services set-top box.

The AR processor 148 supports or contributes to various AR tasks associated with the functionality of the system 100. The AR processor 148 may be utilized in addition to or in lieu of the AR processor 130 of the processing system 104. In certain embodiments, the AR processor 148 utilizes AR modeling techniques, which may be influenced or determined by the AR processor 130. To this end, the AR processor 130 can generate, maintain, and update AR models as needed, and provide updated AR models to the user device 108 at appropriate times. Accordingly, the AR processors 130, 148 may be configured for adaptive and dynamic training and learning for purposes of refining and optimizing AR models. The video processor 150 and the media player application 152 of the user device 108 are responsible for performing various video processing and presentation tasks that support the functionality of the system 100.

If the user device 108 includes sufficient native processing power, processing speed, and memory resources, then a cloud-based AR processor 130 need not be involved. In such a deployment, the native processing capability of the user device 108 can support the various AR processing tasks described here, and can update and refine AR models in an independent manner.

The user device 108 may be implemented as computer-based or processor-based electronic device having appropriate supporting applications installed thereon. For example, the media player application 152 supports the playback of video program content, which can be provided by the video program source 102. Alternatively or additionally, the media player application 152 supports the playback of stored on-demand media content, which can be locally stored at the user device 108 or remotely stored for access via the network 126. The video processor 150 and the media player application 152 may also be suitably designed and configured to support the processing, rendering, and presentation of live video feeds that capture the users 110, 114, 118, 122.

Figure 2:
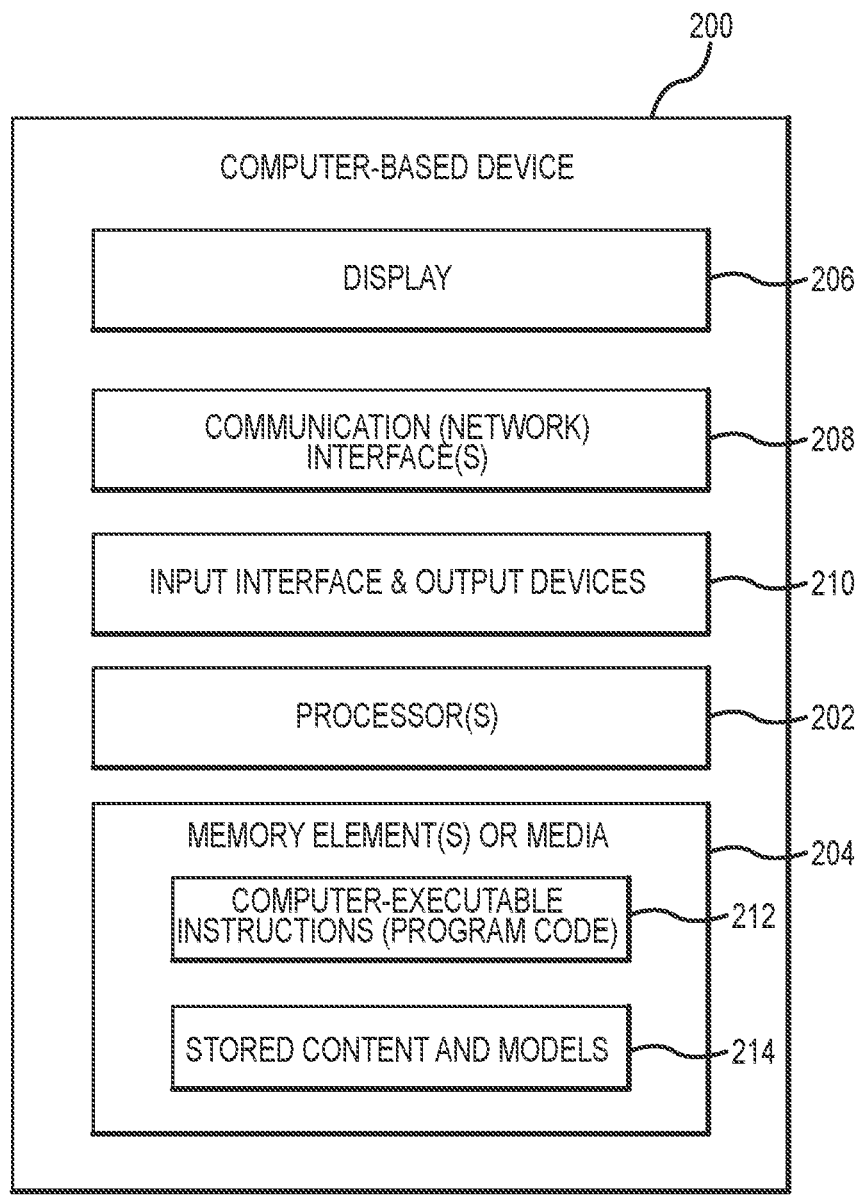
FIG. 2 is a simplified block diagram representation of an exemplary embodiment of a computer-based device.

In accordance with certain embodiments, any of the hardware components shown in FIG. 1 can be implemented as a computer-based or a processor-based device, system, or piece of equipment. Thus, the video program source 102, the processing system 104, and the user devices 108, 112, 116, 120 may be realized as electronic processor-driven components. In this regard, FIG. 2 is a simplified block diagram representation of an exemplary embodiment of a computer-based device 200, which may be used to implement any of the devices or systems shown in FIG. 1.

The device 200 generally includes, without limitation: at least one processor 202; at least one memory storage device, storage media, or memory element 204; a display 206; at least one communication (network) interface 208; and input and output (I/O) devices 210, such as an input interface, one or more output devices, one or more human/machine interface elements, or the like. In practice, the device 200 can include additional components, elements, and functionality that may be conventional in nature or unrelated to the particular media playback and augmented reality functionality described here.

A processor 202 may be, for example, a central processing unit (CPU), a field programmable gate array (FPGA), a microcontroller, an application specific integrated circuit (ASIC), or any other logic device or combination thereof. One or more memory elements 204 are communicatively coupled to the at least one processor 202, and can be implemented with any combination of volatile and non-volatile memory. The memory element 204 has non-transitory machine-readable and computer-executable instructions (program code) 212 stored thereon, wherein the instructions 212 are configurable to be executed by the at least one processor 202 as needed. When executed by the at least one processor 202, the instructions 212 cause the at least one processor 202 to perform the associated tasks, processes, and operations defined by the instructions 212. Of course, the memory element 204 may also include instructions associated with a file system of the host device 200 and instructions associated with other applications or programs. Moreover, the memory element 204 can serve as a data storage unit for the host device 200. For example, the memory element 204 can provide a storage buffer for images (e.g., video frame thumbnails, selected screenshots, or the like) and/or for video content that is presented by the device 200. In certain embodiments, the memory element 204 is used to maintain stored media content and models 214 that can be accessed and utilized by the device 200. For example, the user device 106 shown in FIG. 1 may use one or more stored AR models.

The display 206 may be integrated with the device 200 or communicatively coupled to the device 200 as a peripheral or accessory component. The shape, size, resolution, and technology of the display 206 will be appropriate to the particular implementation of the device 200. The display 206 can be realized as a monitor, touchscreen, or another conventional electronic display that is capable of graphically presenting data and/or information provided by the device 200. The display 206 is communicatively coupled to the at least one processor 202, and it can leverage existing technology to detect touch gestures and contact with a user's finger (or fingers), a stylus, or the like.

The communication interface 208 represents the hardware, software, and processing logic that enables the device 200 to support data communication with other devices. In practice, the communication interface 208 can be suitably configured to support wireless and/or wired data communication protocols as appropriate to the particular embodiment. For example, if the device 200 is a smartphone, then the communication interface 208 can be designed to support a cellular communication protocol, a short-range wireless protocol (such as the BLUETOOTH communication protocol), and a WLAN protocol. As another example, if the device 200 is a desktop or laptop computer, then the communication interface can be designed to support the BLUETOOTH communication protocol, a WLAN protocol, and a LAN communication protocol (e.g., Ethernet). In practice, the communication interface 208 enables the device 200 to receive media content for presentation on the display 206, wherein the media content can be downloaded, streamed, or otherwise provided for playback or for storage at the device 200.

The I/O devices 210 enable the user of the device 200 to interact with the device 200 as needed. In practice, the I/O devices 210 may include, without limitation: an input interface to receive media content for handling by the device 200; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device. In this context, a touchscreen display 206 can be categorized as an I/O device 210. Moreover, a touchscreen display 206 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

This description assumes that an electronic device of the type described above can be operated to present media content and/or live video feeds to a viewing user. The source, format, and resolution of the media content are unimportant for purposes of this description. Indeed, the data that conveys the media content can be locally stored at the electronic device, or it can be provided in an on-demand streaming media format from a content source, a service provider, a cloud-based entity, or the like. The following description assumes that each user device 108, 112, 116, 120 and its installed media player application 152 can successfully and compatibly process, render, and display the desired media (video) content in an appropriate manner.

Figure 3:
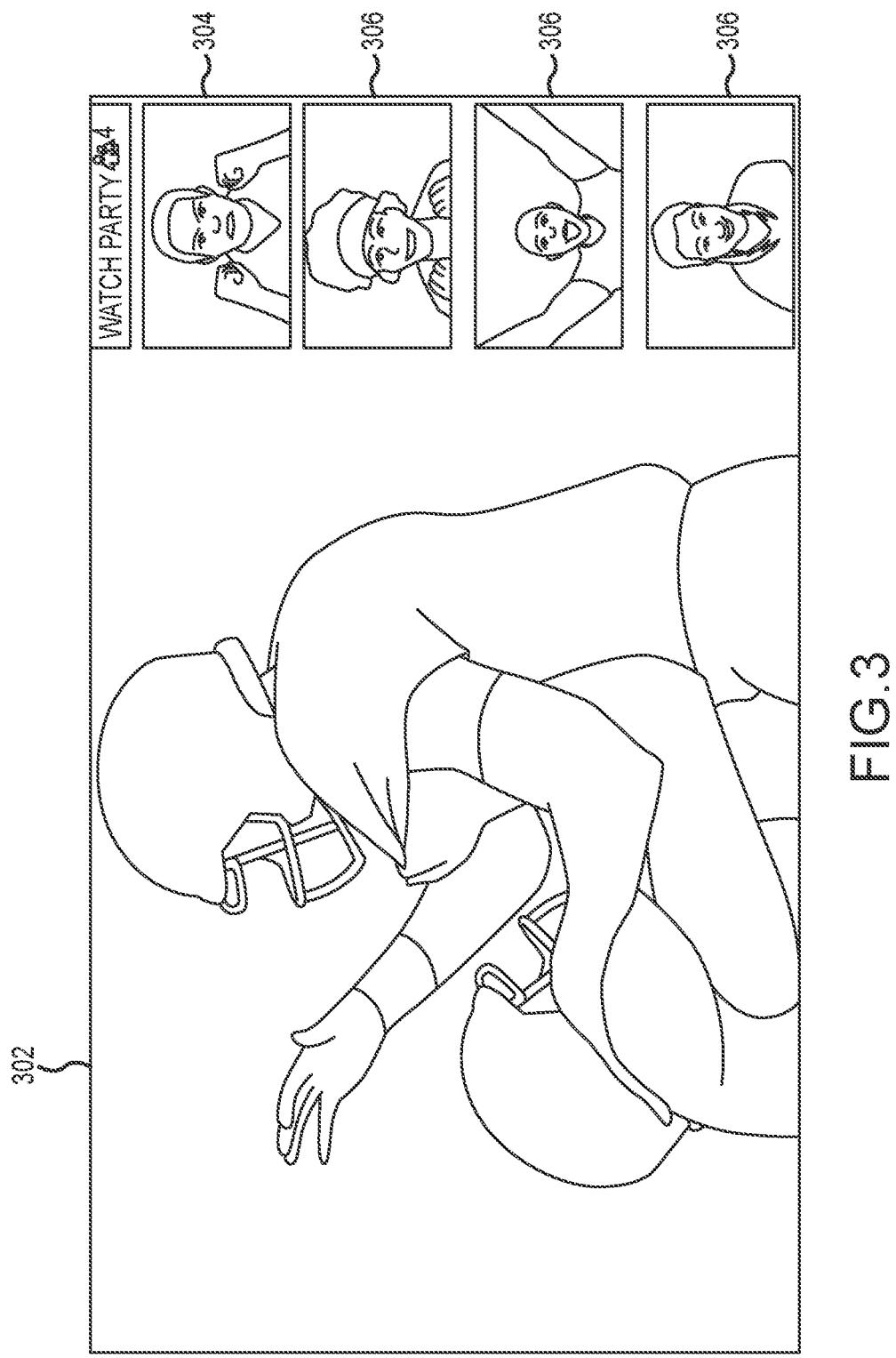
FIG. 3 is an illustration that represents a screen capture of a video program displayed with live video feeds of viewing users.

The subject matter presented here relates to the use of augmented reality features in connection with the viewing of a video program. Although an embodiment of the system 100 can support a single-user viewing mode (where one viewing user watches a video program with a live video feed of the user displayed next to the video program), the following description focuses on a multi-user viewing mode. In this regard, FIG. 3 is an illustration that represents a screen capture of a video program 302 displayed with live video feeds of four viewing users (a "watch party" mode). One live video feed 304 is associated with the host of the watch party, and the other three live video feeds 306 are associated with invited guests or participants. FIG. 3 depicts the visual content that appears on a display associated with a viewing user, such as the host. The visual content may be rendered in a full-screen mode or within a smaller window that does not occupy the full area of the display. The arrangement, shape, size, and ordering of the displayed content (i.e., the video program 302 and the live video feeds 304, 306) may vary from one embodiment to another, from one user device to another, etc. For example, the window locations and orientations of the live video feeds 304, 306 need not be as depicted in FIG. 3.

The watch party viewing mode allows multiple viewing users to enjoy the same video program while interacting with each other. The live video feeds 304, 306 provide visual feedback, and microphones at the end user devices can be used to supplement the audio track of the video program 302. In certain embodiments, the system 100 supports a live chat interface (not shown in FIG. 3) that allows the participants to post messages while watching the video program 302. The system 100 is suitably configured to provide augmented reality features in a dynamic manner for displaying with one or more of the live video feeds 304, 306. FIG. 3 depicts a state where no augmented reality items are displayed.

Figure 4:
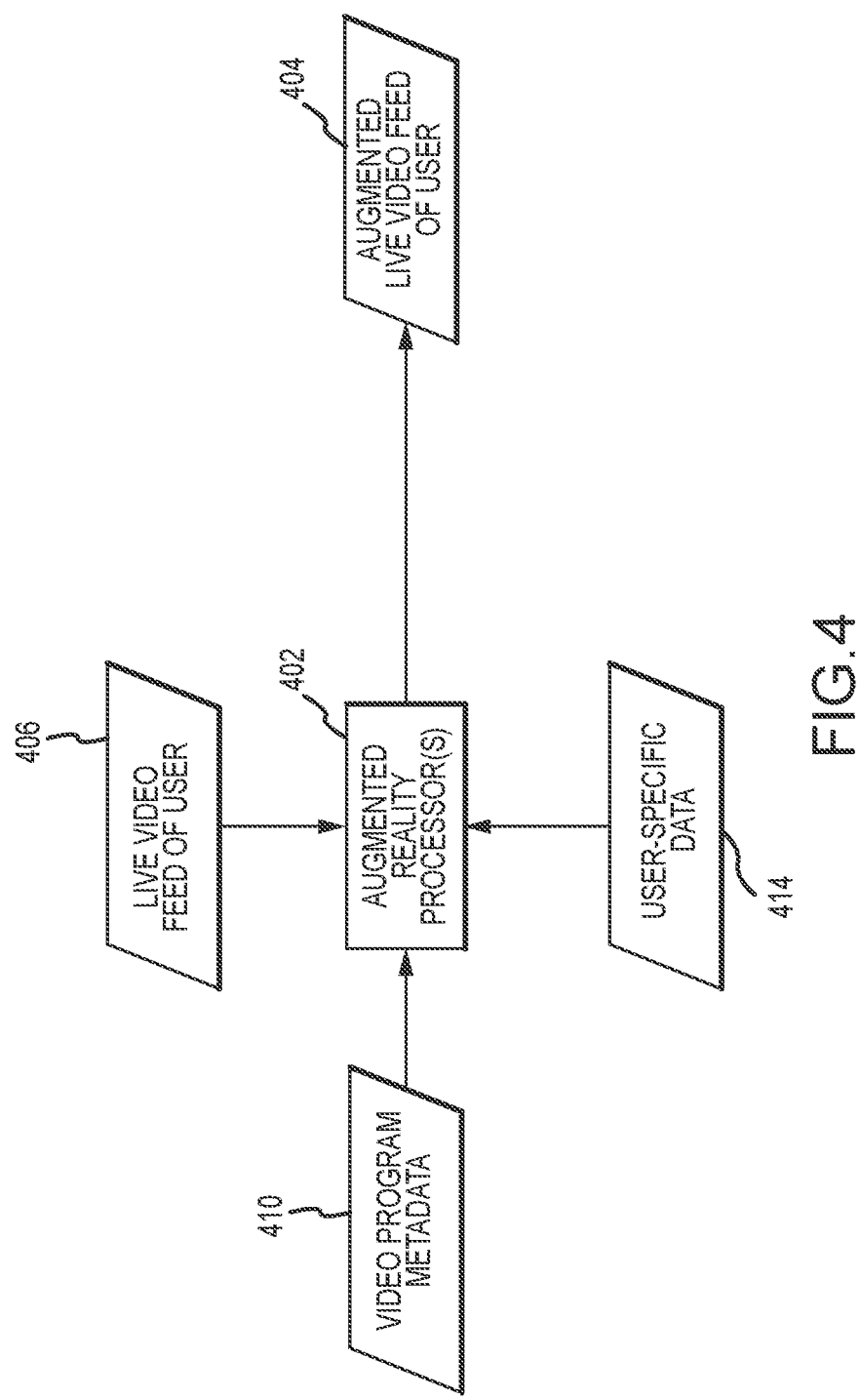
FIG. 4 is a diagram that depicts the generation of an enhanced version of a live video feed of a viewing user.

FIG. 4 is a diagram that depicts the generation of an enhanced version of a live video feed of a viewing user, wherein the enhanced version contains at least one augmented reality item, feature, object, or indication (referred to here as "AR content"). In certain embodiments, at least one AR processor 402 (for example, the AR processor 130 and/or the AR processor 150 shown in FIG. 1) generates an augmented live video feed 404 of the user. The augmented live video feed 404 is generated by combining the original live video feed 406 of the user with the desired AR content. For example, the AR content can be generated as overlay content that is superimposed over the original live video feed 406.

The visual appearance, characteristics, and/or dynamic behavior of the AR content is influenced by metadata 410 associated with the video program. In this way, the AR content can be contextually linked to, or otherwise associated with, the content of the video program being watched. Alternatively or additionally, the visual appearance, characteristics, and/or dynamic behavior of the AR content is influenced by user-specific data 414 associated with at least one of the viewing users. Thus, the AR content can be customized or individualized based on user preferences, user profile data, user demographics, or the like.

Some or all of the video program metadata 410 may be provided with the video program data. Alternatively or additionally, some or all of the video program metadata 410 may be provided separately from the video program data. In this regard, some or all of the program metadata 410 can be provided by a third party provider or service, such as a real-time sports scoring service, a weather service, a news agency, a traffic reporting service, or the like. The video program metadata 410 may include any of the following, without limitation: data that identifies subject matter of the video program; data that identifies a title of the video program; data that identifies timing of the video program; data that identifies people, characters, sports teams, organizations, companies, objects, or entities that appear in the video program; data that identifies weather conditions; data that identifies environmental conditions; data that identifies scoring updates for a sporting event that appears in the video program; data that identifies plays, events, or activity for a sporting event that appears in the video program; and/or data that identifies a location associated with subject matter of the video program (e.g., a location portrayed in the video program, a location with which a sports team is affiliated, a location mentioned in the video program, or the like).

The video program metadata 410 can be processed to customize at least some of the AR content that appears with a live video feed 406 of a user. A number of examples are provided below—these examples are not exhaustive, and are not intended to be limiting of the described subject matter.

Example 1: a futuristic theme is used for AR content when the video program is a science fiction movie.

Example 2: a baseball theme is used for AR content when the video program is a baseball game, such that the AR content includes baseball equipment, baseball uniforms, a baseball stadium in the background, etc.

Example 3: the viewing user can "wear" virtual clothing, hats, or accessories that identify a team or a player when the video program is a sporting event (such as a team uniform, a specific player's jersey with the player's number, a hat with a team logo or mascot).

Example 4: the viewing user can alter their appearance with AR content that is designed to resemble someone or something in the video program (such as an actor's hairstyle, a costume, or body type).

Example 5: the AR content includes items that resemble weather or environmental conditions shown in the video program.

Example 6: for a sporting event, the AR content dynamically changes based on scoring updates.

Example 7: for a sporting event, the AR content dynamically changes based on the occurrence of certain plays, events, or activities.

Example 8: the AR content includes background or scenery that corresponds to a location portrayed in the video program or a location referenced by the video program.

Example 9: a set of emojis are dynamically provided to a viewing user based on the occurrence of certain plays, events, or activities in the video program (such as scoring updates for a sporting event, emotional scenes in a movie, or the like).

Some or all of the user-specific data 414 may be submitted by the viewing user. Alternatively or additionally, some or all of the user-specific data 414 may be maintained by a video services provider or by an entity that monitors viewing user activity, viewing habits, and the like. For example, user-specific data 414 may include or represent user selections, user preferences, user profile information, and/or settings associated with user devices. The user-specific data 414 may include any of the following, without limitation: user profile data; data that identifies a location of the viewing user; account data for the viewing user; subscription data for the viewing user; historical viewing data for the viewing user; an augmented reality theme selected by the viewing user; at least one emoji or at least one emoji set selected by the viewing user; user-selected preferences of the viewing user; at least one augmented reality item selected by the viewing user; a user avatar for the viewing user; and/or a user profile picture for the viewing user.

The user-specific data 414 can be processed to customize at least some of the AR content that appears with a live video feed 406 of a user. A number of examples are provided below—these examples are not exhaustive, and are not intended to be limiting of the described subject matter.

Example 10: a background or scenery (based on a location or address associated with user profile data) appears as AR content.

Example 11: the viewing user can "wear" virtual clothing, hats, or accessories that identify their hometown team, a favorite player, or a hometown hero when the video program is a sporting event (wherein the viewing user's hometown is determined from user profile data and/or user-designated preferences).

Example 12: the viewing user can alter their appearance with AR content that is designed to resemble one of their favorite actors in the video program (such as an actor's hairstyle, a costume, or body type).

Example 13: the AR content includes items that resemble actual weather or environmental conditions at the viewing user's location.

Example 14: a set of user-selected or user-preferred emojis are provided to a viewing user.

Example 15: the amount, quality, and/or type of AR content available to a given viewing user varies based on a subscription package, service level, or account status of the viewing user.

Example 16: an AR content theme is selected by the viewing user, such as selecting a team or a player if the video program is a sporting event.

Example 17: the viewing user selects their avatar, virtual appearance, and/or AR embellishments to be displayed in their live video feed.

Figure 5:
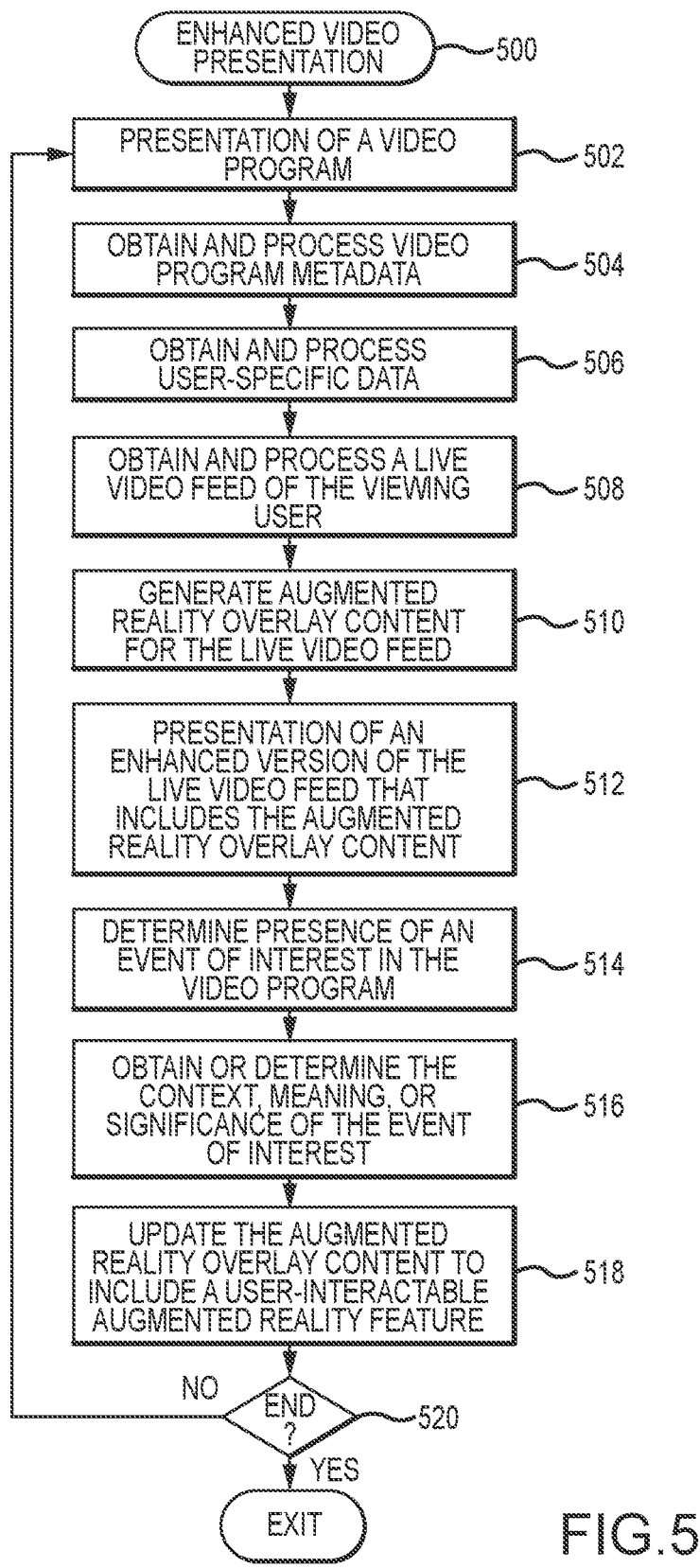
FIG. 5 is a flow chart that illustrates an exemplary embodiment of a process that generates and presents an enhanced version of a live video feed of a viewing user.

FIG. 5 is a flow chart that illustrates an exemplary embodiment of a process 500 that generates and presents an enhanced version of a live video feed of a viewing user. The process 500 can be performed to provide AR features in connection with the presentation of video content to one or more viewing users. The various tasks performed in connection with the process 500 may be performed by software, hardware, firmware, or any combination thereof. For illustrative purposes, the following description of the process 500 may refer to elements mentioned above in connection with FIGS. 1-4. It should be appreciated that the process 500 may include any number of additional or alternative tasks, the tasks shown in FIG. 5 need not be performed in the illustrated order, and the process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

The following description of the process 500 refers to only one viewing user and the corresponding live video feed of that user. As explained above, however, an embodiment of the process 500 can support multiple viewing users. Alternatively or additionally, multiple instantiations of the process 500 may be executed concurrently to support multiple viewing users. The following description assumes that the user device is suitably configured and deployed to support playback of video programs, presentation of a live video feed of the viewing user, and presentation of AR features with the live video feed.

In accordance with the illustrated embodiment, the process 500 causes the presentation of a video program at a user device (task 502). The video program may be a live broadcast or stream, or it may be a stored or recorded on-demand program. The process 500 also obtains and processes metadata that is associated with the video program (task 504). The metadata obtained at task 504 may include any or all of the video program metadata mentioned above with reference to FIG. 4. The process 500 may also obtain and process user-specific data that is associated with the viewing user (task 506). The user-specific data obtained at task 506 may include any or all of the user-specific data mentioned above with reference to FIG. 4. The process 500 also obtains and processes a live video feed of the viewing user (task 508). In certain embodiments, the live video feed is received from a user-facing camera of the user device (i.e., the device that is also presenting the video program to the viewing user).

The process 500 utilizes the obtained metadata and/or the obtained user-specific data to generate AR overlay content for the live video feed (task 510). To this end, task 510 generates the AR overlay content such that the visual appearance of at least some of the AR overlay content is influenced by, determined by, or based on the obtained metadata and/or the obtained user-specific data. The process 500 continues by causing the presentation of an enhanced version of the live video feed at the user device (task 512) The enhanced version of the live video feed includes the original version of the live video feed supplemented by the AR overlay content generated at task 510. In this regard, AR overlay content may be superimposed over a portion of the live video feed, added to the live video feed, or combined with the live video feed. In some scenarios, AR overlay content can be incorporated into the live video feed such that it replaces some of the original content. For example, the background behind the viewing user's body can be replaced with or covered by AR overlay content.

In accordance with certain embodiments, content of the video program is monitored (in real-time or substantially real-time during presentation of the video program, or during a pre-processing routine before presentation of the video program) to detect, identify, or otherwise determine the presence of certain events of interest that occur in the video program (task 514). Determining the occurrence of a "triggering" event of interest can be accomplished in a variety of different ways. If the video program is a live sporting event, the process 500 can obtain and consider scoring updates, game status information, and/or statistics from a real-time data provider service. Alternatively or additionally, the process 500 can utilize optical character recognition (OCR) technology to detect changes to a scoreboard or scorekeeping graphic portrayed in the video program. Alternatively or additionally, the process 500 can leverage artificial intelligence, machine learning, and/or other analytical tools that review visual and/or audio content of the video program as it progresses. If the video program is an on-demand program, then the process 500 can take advantage of program-characterizing metadata that is generated and provided to the system in advance. Such preprocessing enables the process 500 to have event-specific AR content preselected before actual presentation of the video program. Other techniques and methodologies for analyzing the video program can be utilized in this context.

This description assumes that the process 500 detects the occurrence of an event of interest in the video program. In response to this determination, at least some of the AR overlay content can be updated, supplemented, changed, removed, or otherwise modified. Such modification of the AR overlay content can be influenced by, characterized by, controlled by, or otherwise based upon the detected event of interest. To this end, the process 500 may obtain or determine the context, meaning, or significance of the detected event of interest (task 516) for purposes of modifying the AR overlay content.

Although not always required, the example described here assumes that the video program relates to a sporting event (e.g., a football/soccer match, a baseball game, a tennis match, a darts match, a golf game) and that distinguishable or detectable types of physical activity represent different events of interest. For example, an event of interest may be, without limitation: a soccer player kicking a goal; a baseball player hitting a home run or making a defensive play; a basketball player shooting the ball; a darts player throwing a dart; a quarterback of a football team throwing a touchdown pass; a bowler throwing a bowling ball; a cricket batsman hitting a cricket ball; a dancer performing a specific dance move; a yoga instructor performing a specific yoga movement; a martial artist performing a specific martial arts form; etc. It should be noted that an identified event of interest in the video program need not involve human activity. Instead, an event of interest may include physical activity or motion of an inanimate object, an animal, a fictional character, monster, or entity, or the like.

The process 500 may continue by automatically updating the AR overlay content to include a user-interactable AR feature (task 518), wherein the user-interactable AR feature is contextually related to the determined event of interest. In this way, the user-interactable AR feature is closely linked to something portrayed in the video program. For example, the user-interactable AR feature may be a graphical representation of a moving object that appears in the video program, such as: a thrown or hit baseball; a golf ball; a tennis ball; a kicked soccer ball; a struck billiard ball; a thrown discus; a struck volleyball; or the like. The user-interactable AR feature is generated and rendered such that the viewing user can interact in some manner with the displayed AR feature. For example, a user-interactable AR baseball feature may be generated such that the viewing user can "catch" the baseball, "throw" the baseball to another viewing user, "hold" or "save" the baseball, etc. If the video program is a tennis match, then multiple viewing users may have access to AR tennis rackets that they can use to play an AR-based tennis match that takes place in their respective live video feed windows.

Likewise, the AR overlay content can be automatically updated with any type of AR feature (not necessarily user-interactable) in response to the detection of an event of interest. For example, if the event of interest is the ending of a happy movie, then the AR overlay content can be automatically updated with a cheerful background, to depict balloons or streamers in the air, to show animated smiles or laughter from the viewing users, etc.

If the video program has ended (the "Yes" branch of query task 520), then the process 500 exits. Otherwise, the process 500 continues in the manner described above to provide an enhanced/augmented version of the live video feed of the viewing user, which is related in some way to the video program being presented.

Figure 6:
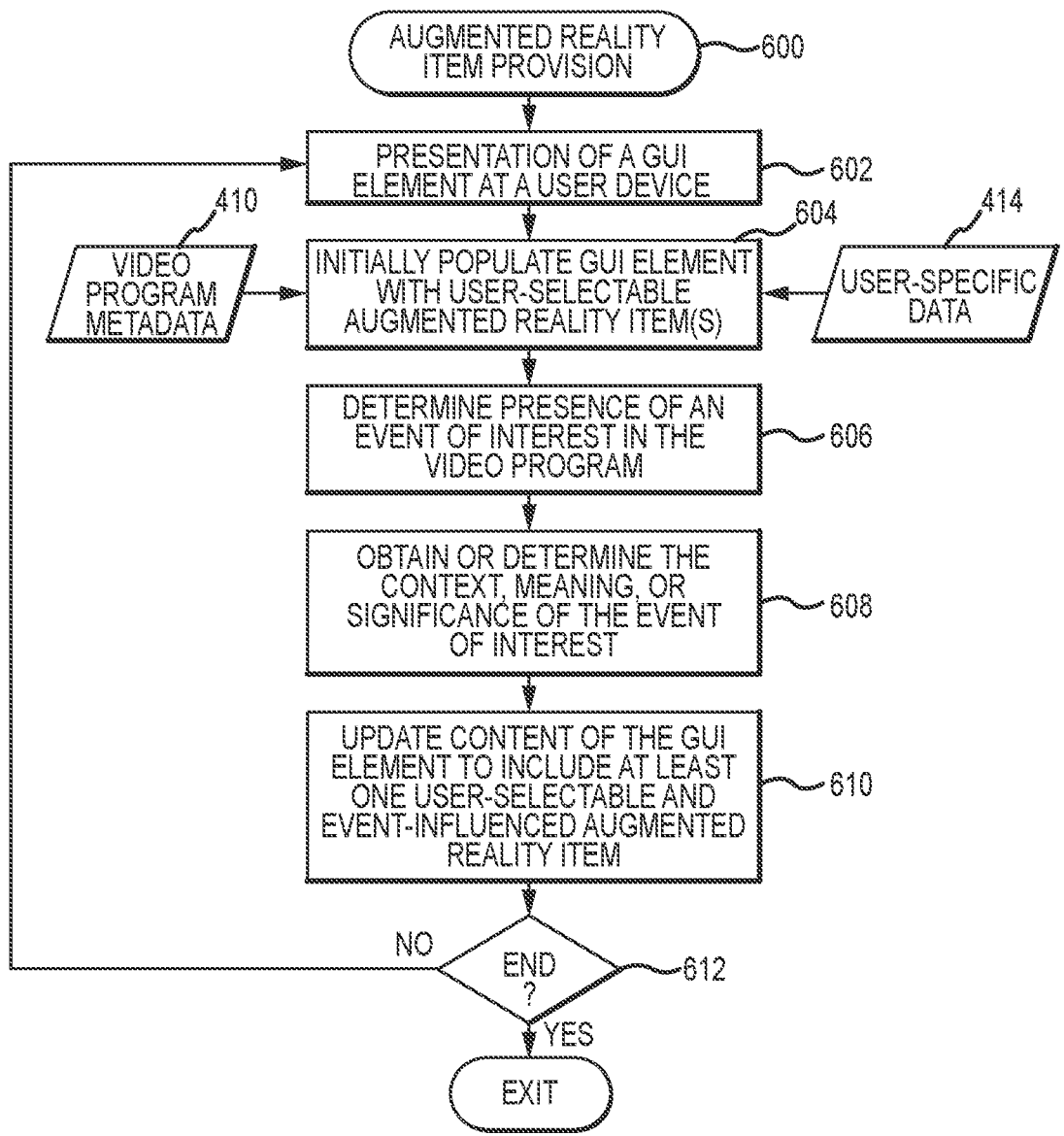
FIG. 6 is a flow chart that illustrates an exemplary embodiment of a process that provides user-selectable augmented reality items.

FIG. 6 is a flow chart that illustrates an exemplary embodiment of a process 600 that provides user-selectable augmented reality items. The various tasks performed in connection with the process 600 may be performed by software, hardware, firmware, or any combination thereof. For illustrative purposes, the following description of the process 600 may refer to elements mentioned above in connection with FIGS. 1-5. It should be appreciated that the process 600 may include any number of additional or alternative tasks, the tasks shown in FIG. 6 need not be performed in the illustrated order, and the process 600 may be incorporated into a more comprehensive procedure or process having additional functionality not described in detail herein. Moreover, one or more of the tasks shown in FIG. 6 could be omitted from an embodiment of the process 600 as long as the intended overall functionality remains intact.

The process 600 may be performed by the system 100 to give a viewing user the opportunity to select AR items, an AR theme, emojis, or AR features to be displayed with their live video feed. For this particular embodiment, the process 600 causes the presentation of at least one graphical user interface (GUI) element at the user device (task 602). In practice, the GUI element may include or be realized as a drop-down menu, a selectable list, a grid or matrix of selectable icons, or the like. The GUI element enables user-selection of at least one AR item, feature, theme, or object for inclusion in the AR overlay content associated with the user's live video feed. In certain implementations, the GUI element is initially populated with one or more user-selectable AR items (task 604). The GUI element may be initially populated based on at least some of the video program metadata 410 and/or based on at least some of the user-specific data 414, as depicted in FIG. 6.

During presentation of the video program, the process 600 detects, identifies, or otherwise determines the presence of certain events of interest that occur in the video program (task 606), and obtains or determines the context, meaning, or significance of the detected event of interest (task 608). Task 606 is similar to task 514, and task 608 is similar to task 516 (tasks 514 and 516 are described in detail above and will not be redundantly described here).

The process 600 may continue by automatically updating the content of the GUI element to enable selection of at least one event-influenced AR item for inclusion in the AR overlay content (task 610), wherein the at least one event-influenced AR item is contextually related to the determined event of interest. In this way, the set of user-selectable AR items is linked to something that has occurred in the video program. For example, the user-selectable AR items may change in response to what is happening in a movie. As another example, the user-selectable AR items may change in response to scoring updates in a sporting event. As another example, the user-selectable AR items may change at the conclusion of the video program.

If the video program has ended (the "Yes" branch of query task 612), then the process 600 exits. Otherwise, the process 600 continues in the manner described above to continue updating the GUI element (as needed) during presentation of the video program.

Figure 7:
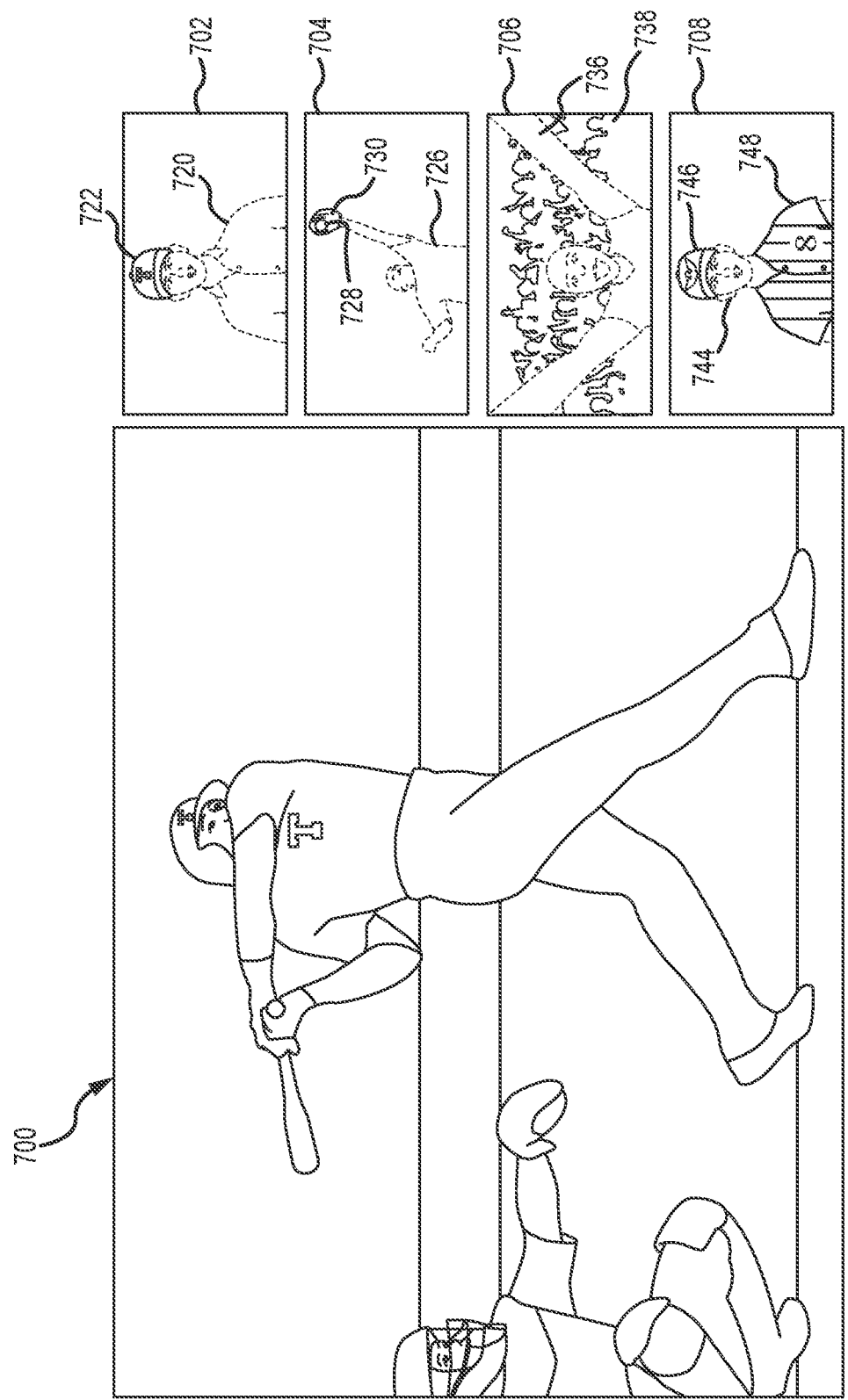
FIG. 7 is an illustration that represents a screen capture of a video program displayed with enhanced versions of live video feeds of viewing users.

FIG. 7 is an illustration that represents a screen capture of a video program 700 displayed with enhanced versions of live video feeds of viewing users. A first video feed 702 is associated with a first viewing user, a second video feed 704 is associated with a second viewing user, a third video feed 706 is associated with a third viewing user, and a fourth video feed 708 is associated with a fourth first viewing user. Each video feed shown in FIG. 7 is enhanced with at least one AR feature, item, or element. As explained above, any of the live video feeds can be enhanced in a manner that is influenced by or is otherwise related to the video program 700. FIG. 7 depicts merely one scenario where the AR methodologies described here can be implemented to provide a more enjoyable and interesting viewing experience to the viewing users. The enhanced video feeds in FIG. 7 are depicted in the following manner: dashed or dotted lines indicate content that appears in the original source versions of the live video feeds; solid or unbroken lines indicate enhanced content (AR items or elements) that has been added to, combined with, or integrated into the live video feeds.

The enhanced video feed 702 captures the first viewing user 720. For this example, the video program 700 is a baseball game between a home team and a visitor team. FIG. 7 shows a player on the visitor team during a swing. The enhanced video feed 702 includes AR content in the form of a baseball cap 722 rendered on the head of the first viewing user 720. Notably, the baseball cap 722 is generated and displayed to resemble the baseball caps worn by players on the visitor team (e.g., the cap has the same style, colorway, logo or mascot, etc.). As mentioned above, the system 100 may allow users to choose an AR theme that is associated with one of the teams featured in the video program 700.

The enhanced video feed 704 captures the second viewing user 726. The enhanced video feed 704 includes dynamic AR content in the form of a baseball 728 flying into the field of view. The enhanced video feed 704 also includes AR content in the form of a baseball glove 730 rendered on the hand of the second viewing user 726. In certain embodiments, the flight path of the AR baseball 728 is triggered by, responsive to, or otherwise influenced by real-time or nearly real-time action occurring in the video program 700 (such as a hit made by a batter, a ball thrown by a player, or a pitched ball). Moreover, the enhanced video feed 704 demonstrates an exemplary gamified interface, wherein the system 100 supports an AR-based game mode that enables the second viewing user 726 to interact with the AR baseball 728. For example, the second viewing user 726 can attempt to catch the AR baseball 728 with the AR baseball glove 730, throw the AR baseball 728 to a different viewing user, hold and place the AR baseball 728 somewhere in the background, attempt to hit the AR baseball 728 with an AR baseball bat, or the like. Another viewing user could be provided with an AR baseball bat that allows them to take a swing at the AR baseball 728 thrown by the second viewing user 726. These and other examples are possible, and various scenarios can be supported by the system to make the game mode related to the content or action that appears in the video program 700.

The enhanced video feed 706 captures the third viewing user 736. For this example, the enhanced video feed 706 includes AR content in the form of a background 738 that resembles the baseball stadium featured in the video program 700. In this regard, the actual background behind the third viewing user 736 is replaced with the AR background 738 such that the third viewing user 736 appears to be sitting in the crowd.

The enhanced video feed 708 captures the fourth viewing user 744. For this example, the fourth viewing user 744 has selected an AR theme that corresponds to the home team. To this end, the enhanced video feed 708 includes AR content in the form of a baseball cap 746 rendered on the head of the fourth viewing user 744 and in the form of a baseball jersey 748 worn by the fourth viewing user 744. Notably, the baseball cap 746 and the baseball jersey 748 are generated and rendered to resemble the baseball uniforms worn by players on the home team. As mentioned above, the system 100 may allow the fourth viewing user 744 to select the AR theme corresponding to the that is associated with one of the teams featured in the video program 700.

Figure 8:
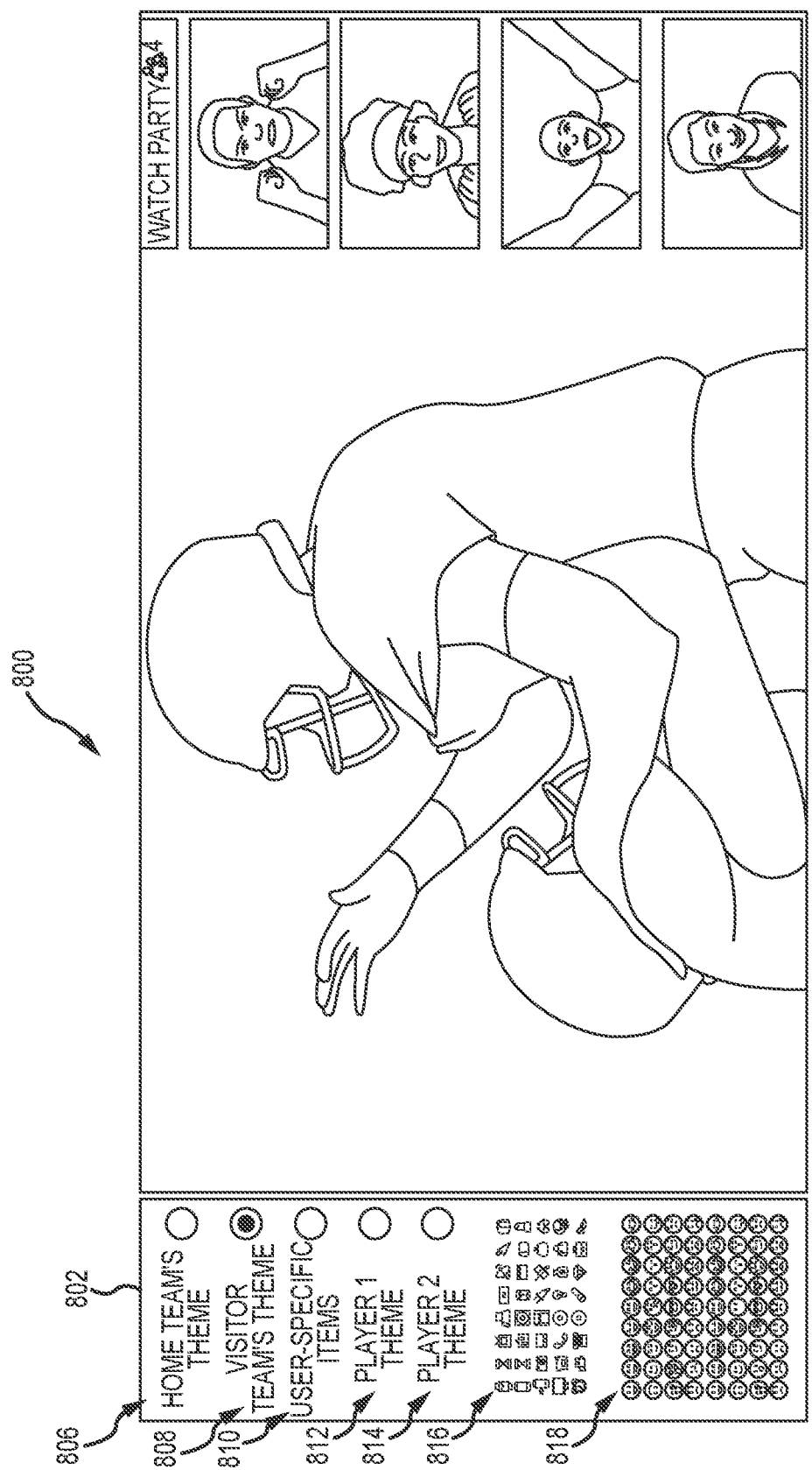
FIG. 8 is an illustration that represents a screen capture of a video program displayed with live video feeds of viewing users and a graphical user interface element that accommodates user-selectable features.

FIG. 8 is an illustration that represents a screen capture 800 similar to that depicted in FIG. 3. FIG. 8 depicts a state where a GUI element 802 is displayed with the video program and with the live video feeds. Alternatively, the GUI element 802 can be displayed in an overlapping or superimposed window or in a window that replaces other displayed content. The GUI element 802 accommodates the presentation of user-selectable AR features, themes, items, or content. In this regard, each participating viewing user may have the option to launch a user-specific GUI element 802, which may include user-customized options to select (as described above).

The illustrated embodiment of the GUI element 802 includes at least the following selectable features, without limitation: a home team AR theme 806; a visitor team AR theme 808; a set of user-specific items 810; a first player theme 812; a second player theme 814; individual AR items 816; and individual emojis 818. FIG. 8 shows a state where a viewing user has selected to use the visitor team AR theme 808. Some selections may be mutually exclusive (e.g., one cannot select both the home team AR theme 806 and the visitor team AR theme 808). In some embodiments, a viewing user can select multiple themes, categories, and/or sets of items.

Notably, the home team AR theme 806, the visitor team AR theme 808, the first player theme 812, and the second player theme 814 are all contextually linked to or otherwise influenced by the content of the displayed video program (e.g., a football game). In contrast, the user-specific items 810 may include user-selected favorite AR items, AR content that is associated with or otherwise linked to user preferences, user configuration data, user profile data, user demographic data, user account data, or the like. Some or all of the individual AR items 816 may (but need not) be contextually linked to or otherwise associated with the displayed video program. Likewise, some or all of the individual emojis 818 may (but need not) be contextually linked to or otherwise associated with the displayed video program. These user-selectable aspects of the system 100 provide further enhancement, enjoyment, and entertainment to the viewing users.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method comprising:
    receiving a first video feed comprising a visual appearance of a first viewer captured by a user-facing camera of a first user device;
    streaming a live program for presentation on the first user device and on a second user device,
        wherein the live program is displayed with the first video feed of the first viewer viewing the live program on the first user device, and
        wherein the live program and the first video feed are displayed with a second video feed of a second viewer viewing the live program on the second user device;
    receiving program metadata describing events occurring in the live program;
    generating an augmented reality overlay relevant to the live program in response to the program metadata describing the events occurring in the live program, the first video feed of the first viewer viewing the live program, and the second video feed of the second viewer viewing the live program; and
    displaying the generated augmented reality overlay over the first video feed on the first user device and on the second user device, wherein the augmented reality overlay modifies the visual appearance of the first viewer in the first video feed,
    wherein the augmented reality overlay moves at least partially from the visual appearance of the first viewer in the first video feed to a visual appearance of the second viewer in the second video feed in response to a first action by the first viewer in the first video feed,
    wherein the augmented reality overlay reacts to a second action by the visual appearance of the second viewer in the second video feed.

2. The method of claim 1, wherein the program metadata comprises at least one of:
    data that identifies subject matter of the live program;
    data that identifies a title of the live program;
    data that identifies timing of the live program;
    data that identifies people, characters, sports teams, organizations, companies, objects, or entities that appear in the live program;
    data that identifies weather conditions;
    data that identifies environmental conditions;
    data that identifies scoring updates for a sporting event that appears in the live program;
    data that identifies plays, events, or activity for a sporting event that appears in the live program; and
    data that identifies a location associated with subject matter of the live program.

3. The method of claim 1, further comprising obtaining user-specific data associated with the first viewer, wherein the first video feed of the first viewer is adapted based on the obtained user-specific data.

4. The method of claim 3, wherein the user-specific data comprises at least one of:
    user profile data;
    data that identifies a location of the first viewer;
    account data for the first viewer;
    subscription data for the first viewer;
    historical viewing data for the first viewer;
    an augmented reality theme selected by the first viewer;
    at least one emoji selected by the first viewer;

user-selected preferences of the first viewer;
at least one augmented reality item selected by the first viewer;
a user avatar for the first viewer; and
a user profile picture for the first viewer.

5. The method of claim 1, further comprising causing presentation of a graphical user interface (GUI) element at the first user device, the GUI element enabling selection of at least one augmented reality item for inclusion in the augmented reality overlay.

6. The method of claim 5, further comprising:
detecting an event of interest in the live program; and
updating selectable elements in the GUI element to enable selection of at least one event-influenced augmented reality item for inclusion in the augmented reality overlay, wherein the selectable elements are contextually related to the event of interest.

7. The method of claim 1, wherein a user-interactable augmented reality feature of the augmented reality overlay comprises a graphical representation of a moving sports object that appears in the live program, wherein the second viewer interacts with the moving sports object in the second video feed.

8. The method of claim 1, wherein the augmented reality overlay comprises a ball, and wherein the first action by the first viewer in the first video feed comprises a throwing motion to throw the ball from the first video feed.

9. A system comprising:
at least one processor; and
at least one processor-readable medium associated with the at least one processor, the at least one processor-readable medium storing processor-executable instructions configurable to be executed by the at least one processor to perform an automated process of providing augmented reality features in connection with a live presentation of a video program on a media playback application, the automated process comprising:
obtaining imagery of a first viewer in real time while the first viewer is viewing the live presentation of the video program on a first user device running the media playback application, the imagery of the first viewer comprising a visual appearance of the first viewer;
obtaining real time metadata that describes events occurring within the video program;
processing the real time metadata to generate an augmented reality overlay relevant to the live presentation and for application to the imagery of the first viewer,
wherein the augmented reality overlay modifies a visual appearance of the first viewer; and
providing the augmented reality overlay and the visual appearance of the first viewer for presentation with the live presentation of the video program by a second user device running the media playback application,
wherein a visual appearance of a second viewer viewing the live presentation on the second user device is presented on the second user device adjacent the visual appearance of the first viewer,
wherein the augmented reality overlay moves at least partially from the visual appearance of the first viewer to the visual appearance of the second viewer in response to a first action by the visual appearance of the first viewer,
wherein the augmented reality overlay reacts to a second action by the visual appearance of the second viewer.

10. The system of claim 9, wherein the first user device comprises a user-facing camera; and
wherein obtaining the imagery of the first viewer further comprises receiving a live video feed from the user-facing camera.

11. The system of claim 9, wherein the real time metadata comprises at least one of:
data that identifies subject matter of the video program;
data that identifies a title of the video program;
data that identifies timing of the video program;
data that identifies people, characters, sports teams, organizations, companies, objects, or entities that appear in the video program;
data that identifies weather conditions;
data that identifies environmental conditions;
data that identifies scoring updates for a sporting event that appears in the video program;
data that identifies plays, events, or activity for a sporting event that appears in the video program; and
data that identifies a location associated with subject matter of the video program.

12. The system of claim 9, wherein the automated process further comprises:
obtaining user-specific data associated with the first viewer,
wherein the visual appearance of the first viewer is adapted by the obtained user-specific data.

13. The system of claim 12, wherein the user-specific data comprises at least one of:
user profile data;
data that identifies a location of the first viewer;
account data for the first viewer;
subscription data for the first viewer;
historical viewing data for the first viewer;
an augmented reality theme selected by the first viewer;
at least one emoji selected by the first viewer;
user-selected preferences of the first viewer;
at least one augmented reality item selected by the first viewer;
a user avatar for the first viewer; and
a user profile picture for the first viewer.

14. The system of claim 9, wherein the automated process further comprises causing presentation of a graphical user interface (GUI) element at the first user device, the GUI element enabling selection of at least one augmented reality item for inclusion in the augmented reality overlay.

15. The system of claim 14, wherein the automated process further comprises:
determining presence of an event of interest in the video program; and
updating content of the GUI element to enable selection of at least one event-influenced augmented reality item for inclusion in the augmented reality overlay,
wherein the at least one event-influenced augmented reality item is contextually related to the event of interest.

16. The system of claim 9, wherein the automated process further comprises:
determining presence of an event of interest in the video program; and
automatically updating the augmented reality overlay to include a user-interactable graphical representation of a moving object that appears in the video program.

17. A data processing system to create an augmented reality overlay for a plurality of viewers simultaneously watching a live video program, the data processing system comprising:

an interface to a digital network configured to communicate with a first user device operated by a first viewer and a second user device operated by a second viewer, wherein the first user device comprises a forward-facing camera configured to capture a first video stream of the first viewer in real time while the first viewer is watching the live video program;

wherein the second user device is configured to capture a second video stream of the second viewer in real time while the second viewer is watching the live video program; and a processing system configured to perform operations, the operations comprising:

receiving the first and second video streams from the first and second user devices via the interface;

receiving program metadata describing events occurring within the live video program;

processing the program metadata and the first and second video streams of the first and second viewers to generate an augmented reality overlay for the first video stream of the first viewer for display with the live video program, wherein the augmented reality overlay modifies an appearance of the first viewer according to the events occurring within the live video program as indicated by the program metadata;

detecting an event of interest in the live video program;

automatically updating the augmented reality overlay to include a user-interactable augmented reality feature in response to detecting the event of interest, wherein the user-interactable augmented reality feature is contextually related to the event of interest, and wherein the user-interactable augmented reality feature comprises a ball, and wherein the the ball moves from the first video stream of the first viewer to the second video stream of the second viewer in response to the first viewer moving in the first video stream; and providing the generated augmented reality overlay to the first and second user devices for simultaneous presentation of the augmented reality overlay, the first video stream of the first viewer, the second video stream of the second viewer, and the live video program.

18. The data processing system of claim 17, wherein the live video program is a live broadcast of a sporting event, wherein the event occurring within the video program is a scoring event, and wherein the augmented reality overlay modifies the appearance of the second viewer in response to the scoring event so that the second viewer appears to catch the ball.

* * * * *